US010304309B2

(12) United States Patent
Baker

(10) Patent No.: US 10,304,309 B2
(45) Date of Patent: May 28, 2019

(54) BABY SEAT ALARM

(71) Applicant: Steve Baker, Clearwater, FL (US)

(72) Inventor: Steve Baker, Clearwater, FL (US)

(*) Notice: Subject to any disclaimer, the term of this patent is extended or adjusted under 35 U.S.C. 154(b) by 0 days.

(21) Appl. No.: 14/753,081

(22) Filed: Jun. 29, 2015

(65) Prior Publication Data

US 2018/0342141 A1 Nov. 29, 2018

(51) Int. Cl.
G08B 21/22 (2006.01)
G08B 21/02 (2006.01)
B60N 2/00 (2006.01)
B60N 2/26 (2006.01)

(52) U.S. Cl.
CPC ......... *G08B 21/0288* (2013.01); *B60N 2/002* (2013.01); *G08B 21/22* (2013.01); *B60N 2/26* (2013.01)

(58) Field of Classification Search
CPC .... G08B 21/0288; G08B 21/22; G08B 21/24; B60N 2/002
USPC ........................................................ 340/457
See application file for complete search history.

(56) References Cited

U.S. PATENT DOCUMENTS

| 6,104,293 | A  | * | 8/2000  | Rossi  | B60N 2/002 340/457  |
| 6,819,249 | B1 | * | 11/2004 | Papp   | B60N 2/002 307/10.1 |
| 7,250,869 | B2 | * | 7/2007  | Davis  | B60N 2/002 340/667  |
| 8,125,343 | B2 | * | 2/2012  | Denale | B60N 2/002 340/457  |
| 9,539,915 | B2 | * | 1/2017  | Fuks   | B60N 2/002          |

* cited by examiner

Primary Examiner — John A Tweel, Jr.
(74) Attorney, Agent, or Firm — Tiffany C. Miller; Inventions International Inc.

(57) ABSTRACT

Disclosed herein is a device, methods, and systems for a specialized circuit and alert system for use with any motorized vehicle with an integrated electrical system. The circuit may connect to the vehicle electrical system through any available port. When the voltage in the electrical system is high the signal is deactivated, as is the case when the vehicle motor is running and charging the battery and electrical system. When it is low the signal is actuated. The system is further controlled by a switch connected to a sensor or other detection means, which activates the system based upon the presence or absence of an item. The whole of the system therefore operates to activate the system when an item is present and the engine is running, an alert signal is triggered when the vehicle engine is turned off. In the preferred embodiment a sensor is incorporated into a baby seat, and the circuit plugs into the cigarette lighter port.

15 Claims, 3 Drawing Sheets

State table

| Motor Vehicle State | Pressure Switch State | Alarm State |
|---|---|---|
| OFF | OFF | OFF |
| ON | OFF | OFF |
| OFF | ON | ON |
| ON | ON | OFF |

State table label definitions:

Motor Vehicle: *Any motorized vehicle transporting a child in car seat*

Pressure Switch: *Pressure sensitive pressure switch device placed on or under or the car seat padding intending to be open when child is not in the seat and closed when the weight of the infant is placed in the seat*

Alarm: *Noise making device such as buzzer to alert adult that infant is in the car seat with the motor vehicle is turned off*

Fig 3.

BABY SEAT ALARM

CROSS-REFERENCE TO RELATED APPLICATIONS & CONTINUITY DATA

N/A

BACKGROUND OF THE INVENTION

Other baby seat car seat alarm systems are complex and not reliable; a proximity sensor with a keychain FOB can fail as a result of a change in routine such as a different person driving the car. An alarm with Bluetooth to a phone application only works if you have your phone. Other solutions are hardwired into the automobile and are costly.

This user simply places the pressure switch pad under the child and plugs the electronic module into the cigarette lighter port. Once the system is activated it will operate continuously and autonomously without any other intervention.

The system automatically confirms it is functioning every time a child is placed into the seat—the alarm sounds until the automobile is started and the alarm is suppressed by the electronics determining the automobile voltage is higher than the automobile battery resting voltage until the automobile is again shut off. Thus there remains a need for simple and reliable safety devices for preventing leaving a child in a vehicle.

FIELD OF THE INVENTION

The invention relates to automobile accessories and child safety devices, and car seat child alarms

SUMMARY OF THE INVENTION

The present invention refers to an alarm system minimizing the possibility of leaving a child unattended in an automobile. The alarm is activated by means of a pressure switch placed in or embedded within the child car seat. The pressure switch is connected to the electronics module with a noise device to indicate alarm. The electronics module is plugged into the cigarette lighter port of the vehicle. When the child is placed in the seat the child's weight closes the pressure switch and activates the alarm. When the automobile is started the charging voltage of the automobile system is higher than when the automobile is off. The electronic circuit determines the voltage is at a higher state by measuring the voltage at the cigarette port. When the automobile charging system is higher than the "at rest" battery voltage the electronics defeat the alarm.

When the automobile is later turned off the charging system is no longer active and the voltage drops to a resting battery voltage again. The electronic module determines there is a voltage drop and then re-enables the alarm. The alarm continues until the child is removed from the car seat and the pressure switch is then in the "open" position.

As a convenience to the operator, the alarm may be temporarily inhibited via a button when the child is initially seated. In that case circuit is automatically re-activated when the motor is started, and will trigger again the next time the Engine is stopped.

The system in the preferred embodiment can be configured for either 12 volt or 24 volt systems.

BRIEF DESCRIPTION OF THE DRAWINGS FIGURES

FIG. 3 is a logic table defining the alarm states as related to the automobile operating state.

DETAILED DESCRIPTION OF THE PREFERRED EMBODIMENTS

Figure 1:
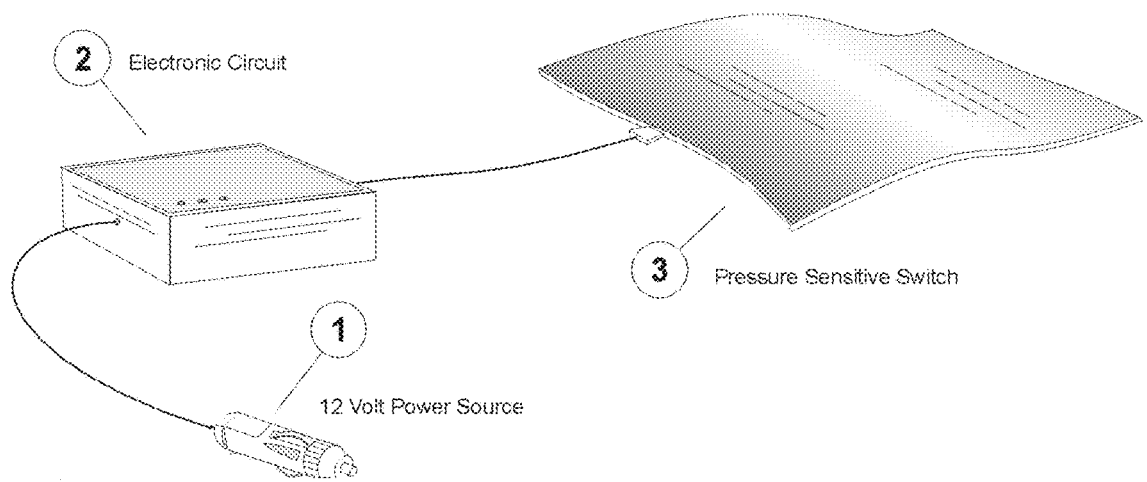
FIG. 1 is a block diagram of the invention components.

Disclosed herein is a device, methods, and systems for a specialized circuit and alert system for use with any motorized vehicle with an integrated electrical system. The circuit may connect to the vehicle electrical system through any available auxiliary port. When the voltage in the electrical system is high the signal is deactivated, as is the case when the vehicle motor is running and charging the battery via the electrical system. When it is low the signal is activated. The system is further controlled by a switch connected to a sensor or other detection means, which activates the system based upon the presence or absence of an item. The whole of the system therefore operates such that the system is armed when an item is present and the engine is running, and an alert signal is triggered when the vehicle engine is turned off (when the voltage level drops). In the preferred embodiment a sensor is incorporated into a baby seat, and the circuit plugs into the cigarette lighter port. When a baby is present the alarm sounds when the car engine is turned off.

For the system to be armed two conditions must be true. The desired item must be present, or condition met, as indicated by the appropriate sensor. The engine must also be operating as indicated through the voltage in the electrical system. Once armed, the alert signal is triggered when the engine is turned off and the item is present.

A myriad of sensors may be used to indicate numerous potential conditions as will be recognized by those skilled in the art. A non-exhaustive list of examples includes but is not limited to mass (weight), light, temperature, electrical activity, motion, humidity, chemical, gas, and others as will be recognized by those skilled in the art.

A console type device, container, or platform may be designed along with a weight or pressure sensor to trigger the alarm when personal property is left behind after the car is turned off such as purses, cell phones, groceries, and the like. The system overall is useful for any items or cargo that are not to be left behind in a vehicle. Other sensors may be also be utilized to indicate an open sunroof, voltage sensor for items left on (headlights, interior lights, etc.), temperature, light sensors, electrical system use, as well as motion sensor for pets. Across the various embodiments the system may be deployed for anything a vehicle user does not want to leave behind in the vehicle, and any condition a vehicle user does not want to continue when the vehicle is not in use or parked.

In the preferred embodiment this system is used to avoid leaving a child behind in a parked car. As described above, if the child is present in the car seat, an alarm will sound when the engine is turned off. This serves to alert the driver a child is in the car and not to leave the car without the child.

Alternative embodiments may include use of any type of sensor, to indicate any condition that will be signaled by any means when the engine is turned off. Many embodiments will be designed to avoid leaving a particular item behind.

The port may be any port, device, connection, splice, usb port, or otherwise that is connected to the electrical system. In the preferred embodiment the port is what is commonly called the cigarette lighter.

The signal may be audio, visual, mechanical or any other means of signaling as will be recognized by those skilled in the art. In the preferred embodiment an audio signal is triggered, which may be used with a visual signal in some embodiments.

The following is meant to further describe the preferred embodiment. The preferred embodiment is an alarm within a child car seat that will activate when the automobile is shut off. The intention is to remind the occupants of the presence of a child in the car minimizing the possibility of leaving a child in an automobile unattended. The alarm is activated by a pressure switch placed under the cushion in the car seat or embedded in the design of the car seat. When a child is placed in the seat the switch is closed. This pressure switch is attached to an electronic circuit incorporating a buzzer or other noise device activated by a small battery when the switch is closed.

The circuit has a connector that plugs into the cigarette lighter port. When this circuit determines the car voltage is high (Automobile is running and the charging system is producing greater than 12 volts) the alarm is defeated. When this circuit determines the car voltage is Low (Automobile is off and the charging system is not active the battery voltage is lower) the alarm is activated. Therefore, when the car is off and the child is in the seat the alarm is sounded. The alarm remains on until the baby is lifted from the seat and the pressure switch under the cushion is open. The system will work with automobiles that have either continuous power to the lighter port or switched power to the lighter port.

The alarm is intended to prevent leaving a child in an unattended vehicle. The preferred embodiment is to have a pressure pad switch that is placed under the child's seat cushion within a car seat. Another embodiment could be a pressure switch under the seat cushion for the child's back. Another embodiment could be to use a sensing device other than a switch to determine there is a child in the car seat.

Now referring to the figures, FIG. 1 is a block diagram representing the preferred embodiment with (1) a standard cigarette lighter port plug to insert into the female counterpart within the automobile, (2) the electronics module designed to determine the automobile voltage continuously as well as incorporate the alarm noise device, (3) a pressure switch pad placed under the cushion of the child car seat connected to the electronics to indicate a child is present in the seat or not.

Figure 2:
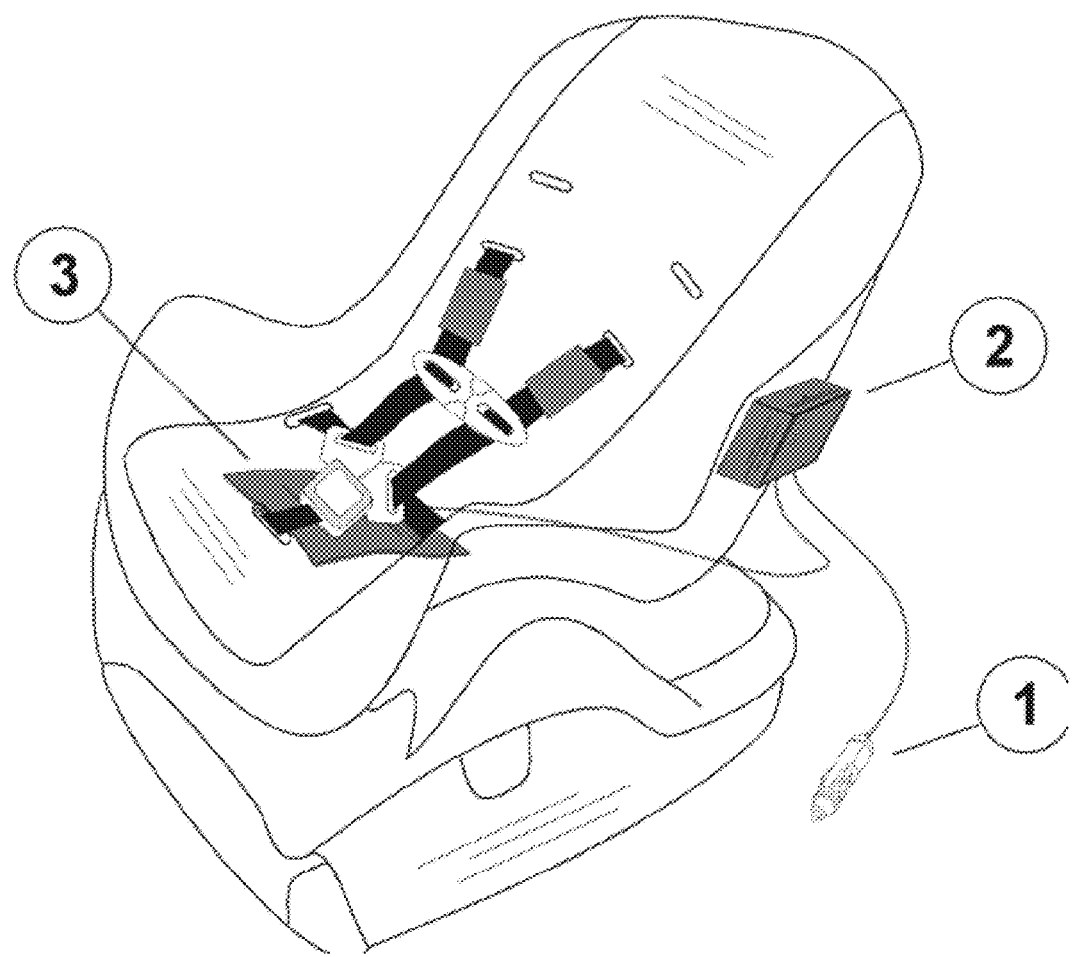
FIG. 2 depicts how the device would be placed in the car seat.

FIG. 2 demonstrates one embodiment of how the device could be placed and attached to a typical car seat with (1) a standard cigarette lighter port plug to insert into the female counterpart within the automobile, (2) the electronics module designed to determine the automobile voltage continuously as well as incorporate the alarm noise device, (3) a pressure switch pad placed under the cushion of the child car seat connected to the electronics to indicate a child is present in the seat or not.

FIG. 3 details the system logical states dependent on the state of the automobile charging system (i.e. on or off) as related to the pressure switch state (when a child is present or not).

In further alternative embodiments the system may be wireless. In these embodiments one or more of the components may communicate with the alert device wirelessly. In one embodiment a Bluetooth or other wireless technology may be connected to the vehicles electrical system, for example through the cigarette port. An additional Bluetooth or wireless component may be connected to a sensor located within the child's car seat. The two wireless devices would then communicate with a device programmed to arm itself with both signals are sending a positive signal (a child is present, and the electrical system indicates the vehicle is running), and actuate a signal when the vehicle is turned off as indicated by the signal from the electrical system being diminished or absent.

Herein the term positive signal may be used to refer to the sensors used with the device or With respect to the electrical system of the vehicle it plugs into. In general when used in relation to the sensors, this refers to a state whereby what the sensor is designed to indicate for is present. When used regarding the connection to the vehicle's electrical system, a positive signal refers to if the threshold level of electricity being transmitted through the connection to indicate that indicates the vehicle's engine is running.

Herein the term "armed" may be used to refer to the system's state. Armed generally means that conditions are met such that the system is prepared to activate an alert when the appropriate conditions are met. For example in the preferred embodiment the system is armed when the electrical system is generating a positive signal and the pressure sensor is generating a positive signal. When the system is armed it is ready to activate an alert when the requisite conditions are met. See FIG. 3 for further details and clarification.

For the purposes of describing and defining the present invention it is noted that the use of relative terms such as "substantially", 'generally", "approximately" and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act or instruction used in this description should be construed as important, necessary, critical or essential to the invention unless explicitly described as such. Although only a few of the exemplary embodiments have been described in detail herein and those skilled in the art will readily appreciate that many modifications are possible in these exemplary embodiments without materially departing from the novel teachings and advantages of this invention. Accordingly all such modifications are intended to be included within the scope of this invention.

The phrase "in one embodiment" is used repeatedly. The phrase generally does not refer to the same embodiment; however, it may. The terms "comprising," "having" and "including" are synonymous, unless the context dictates otherwise. The following illustrations of various embodiments use particular terms by way of example to describe the various embodiments, but this should be construed to encompass and provide for terms such as "method" and "routine" and the like.

Various aspects of the illustrative embodiments will be described using terms commonly employed by those skilled in the art to convey the substance of their work to others skilled in the art. However, it will be apparent to those skilled in the art that the embodiments described herein may be practiced with only some of the described aspects. For purposes of explanation, specific numbers, materials and configurations are set forth in order to provide a thorough understanding of the illustrative embodiments. However, it will be apparent to one skilled in the art that the embodiments described herein may be practiced without the specific details. In other instances, well-known features are omitted or simplified in order not to obscure the illustrative embodiments.

The characteristics and utilities of the present invention described in this summary and the detailed description below are not all inclusive. Many additional features and advantages will be apparent to one of ordinary skill in the art given the following description. There has thus been outlined, rather broadly, the more important features of the invention in order that the detailed description thereof that follows may be better understood, and in order that the present contribution to the art may be better appreciated.

In this respect, by explaining at least one embodiment of the invention in detail, it is to be understood that the invention is not limited in its application to the details of construction and to the arrangements of the components set forth in the description. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the description be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, nor is it intended to be limiting as to the scope of the invention in any way. The characteristics and utilities of the present invention described in this summary and the detailed description below are not all inclusive. Many additional features and advantages will be apparent to one of ordinary skill in the art given the detailed description.

The invention claimed is:

1. An alert system comprising:
   an electronic circuit, said electronic circuit connected to at one end to a vehicle's electrical system and to a sensor at the other end, wherein the system is armed when a positive signal from said sensor and said vehicle's electrical system is present; and,
   an alarm, said alarm is in electrical communication with said vehicle's electrical system, said alarm is configured to activate an alert when said positive signal from said vehicle's electrical system is absent;
   a manually operated bypass switch, said manually operated bypass switch is configured to inhibit an alert of said alarm when a switch of said sensor is oriented in a closed configuration and when said vehicle's electrical system is absent, whereby, said vehicle's electronic circuit is configured to reactivate when said vehicle's electrical system is present.

2. The system of claim 1, wherein the said sensor is any of a pressure sensor, mass sensor, temperature sensor, electrical sensor, chemical sensor, motion sensor or a light sensor.

3. The system of claim 1, wherein a male cigarette lighter connector connects to a vehicle's cigarette lighter port to connect said electronic circuit to said vehicle's electrical system.

4. The system of claim 1, wherein said sensor is a pressure sensor located underneath a child or underneath a child's seat or located within a child's seat.

5. The system of claim 1, wherein said alert is any of an audio signal, visual signal, or an electronic message displayed on a digital display screen.

6. A child safety system for a vehicle comprising:
   an electronic circuit, said electronic circuit connected to at one end to a vehicle's electrical system and to a sensor at the other end, wherein the system is armed when a positive signal from said sensor and said vehicle's electrical system is present; and,
   an alarm, said alarm is in electrical communication with said vehicle's electrical system, said alarm is configured to activate an alert when said positive signal from said vehicle's electrical system is absent;
   a manually operated bypass switch, said manually operated bypass switch is configured to inhibit an alert of said alarm when a switch of said sensor is oriented in a closed configuration and when said vehicle's electrical system is absent, whereby, said vehicle's electronic circuit is configured to reactivate when said vehicle's electrical system is present.

7. The system of claim 6, wherein said sensor is any of a pressure sensor, mass sensor, temperature sensor, electrical sensor, chemical sensor, motion sensor or a light sensor.

8. The system of claim 6, wherein a male cigarette lighter connector connects to a vehicle's cigarette lighter port to connect said electronic circuit to said vehicle's electrical system.

9. The system of claim 6, wherein said sensor is a pressure sensor located underneath a child or underneath a child's seat or located within a child's seat.

10. The system of claim 6, wherein said alert is any of an audio signal, visual signal, or an electronic message displayed on a digital display screen.

11. A child safety device comprising:
    an electronic circuit, said electronic circuit connected to at one end to a vehicle's electrical system and to a sensor at the other end, wherein the system is armed when a positive signal from said sensor and said vehicle's electrical system is present; and,
    an alarm, said alarm is in electrical communication with said vehicle's electrical system, said alarm is configured to activate an alert when said positive signal from said vehicle's electrical system is absent;
    a manually operated bypass switch, said manually operated bypass switch is configured to inhibit an alert of said alarm when a switch of said sensor is oriented in a closed configuration and when said vehicle's electrical system is absent, whereby, said vehicle's electronic circuit is configured to reactivate when said vehicle's electrical system is present.

12. The system of claim 11, wherein said sensor is any of a pressure sensor, mass sensor, temperature sensor, electrical sensor, chemical sensor, motion sensor or a light sensor.

13. The system of claim 11, wherein a male cigarette lighter connector connects to a vehicle's cigarette lighter port to connect said electronic circuit to said vehicle's electrical system.

14. The system of claim 11, wherein said sensor is a pressure sensor located underneath a child or underneath a child's seat or located within a child's seat.

15. The system of claim 11, wherein said alert is any of an audio signal, visual signal, or an electronic message displayed on a digital display screen.

\* \* \* \* \*